(12) United States Patent
Kim et al.

(10) Patent No.: US 10,894,669 B2
(45) Date of Patent: Jan. 19, 2021

(54) CONVEYOR BELT FOR MARGINAL LIFE PREDICTION

(71) Applicant: Woojeong Kim, Daejeon (KR)

(72) Inventors: Woojeong Kim, Daejeon (KR); O Sik Lim, Boryeong-si (KR); Eun Gu Sim, Boryeong-si (KR); Il Ho Choi, Jeonju-si (KR); Jae Kwan Kim, Boryeong-si (KR); Jong Uk Park, Boryeong-si (KR); Soo Hwan Kim, Suncheon-si (KR)

(73) Assignee: Woojeong Kim, Daejeon (KR)

( * ) Notice: Subject to any disclaimer, the term of this patent is extended or adjusted under 35 U.S.C. 154(b) by 375 days.

(21) Appl. No.: 16/068,234

(22) PCT Filed: May 21, 2018

(86) PCT No.: PCT/KR2018/005781
§ 371 (c)(1),
(2) Date: Jul. 5, 2018

(87) PCT Pub. No.: WO2018/221883
PCT Pub. Date: Dec. 6, 2018

(65) Prior Publication Data
US 2020/0377306 A1    Dec. 3, 2020

(30) Foreign Application Priority Data

May 30, 2017   (KR) .................. 10-2017-0066719

(51) Int. Cl.
*B65G 43/02*     (2006.01)
*B65G 15/34*    (2006.01)
(Continued)

(52) U.S. Cl.
CPC ............. *B65G 43/02* (2013.01); *B32B 1/00* (2013.01); *B32B 3/30* (2013.01); *B32B 5/024* (2013.01);
(Continued)

(58) Field of Classification Search
CPC ........ B65G 43/02; B65G 15/34; B65G 15/32; B32B 1/00; B32B 3/30; B32B 5/024; B32B 25/042; B32B 25/10
(Continued)

(56) References Cited

U.S. PATENT DOCUMENTS 5,601,180 A * 2/1997 Steeber ................. B65G 15/62
198/502.1
6,854,593 B2 * 2/2005 Boudreau ............. B65G 15/60
198/502.1
(Continued)

FOREIGN PATENT DOCUMENTS

| JP | 2000007119 A | 1/2000 |
| JP | 4292503 B2 | 7/2009 |

(Continued)

*Primary Examiner* — James R Bidwell
(74) *Attorney, Agent, or Firm* — Rabin & Berdo, P.C.

(57) ABSTRACT

There is provided a conveyor belt for marginal life prediction, in which wear of the degree of the conveyor belt can be well and visually recognized without stopping of the conveyor belt on operation, and the replacement time of the conveyor belt can be easily predicted in advance, thereby to predict and efficiently manage the life time of the conveyor belt. It was difficult to check abrasion extents step by step and exactly predict the life time in the conventional conveyor belts. Further, the accidents of carrying articles released out of the conveyor belt were frequently occurred since troughs of the conveyor belt are not formed enough, and the angle of the trough is so small. As the way of solving the problems as above, while the wear of the conveyor belt is progressed, and when the abrasion check colored rubbers, (Continued)

which are embedded inside the conveyor belt, are exposed outwardly and checked visually by eyes, the extent of the abrasion of the conveyor belt can be estimated and the exchange time of the conveyor belt can be well predicted. The number of the exposed abrasion check colored rubbers is well detected by installing the abrasion check colored rubbers in multi-layers with installation number reduced downwardly, thereby to enable anybody to predict the life time of the conveyor belt step by step precisely.

4 Claims, 6 Drawing Sheets

(51) Int. Cl.
*B32B 1/00* (2006.01)
*B32B 5/02* (2006.01)
*B32B 3/30* (2006.01)
*B32B 25/04* (2006.01)
*B32B 25/10* (2006.01)

(52) U.S. Cl.
CPC ............ *B32B 25/042* (2013.01); *B32B 25/10* (2013.01); *B65G 15/34* (2013.01); *B32B 2250/40* (2013.01); *B32B 2307/4026* (2013.01); *B32B 2433/02* (2013.01); *B65G 2201/045* (2013.01); *B65G 2207/48* (2013.01)

(58) Field of Classification Search
USPC .......................................... 198/846, 847, 841
See application file for complete search history.

(56) References Cited

U.S. PATENT DOCUMENTS

| | | | |
|---|---|---|---|
| 9,915,338 B2* | 3/2018 | Gassman | G01M 13/023 |
| 10,392,193 B2* | 8/2019 | Walker | B65G 19/20 |
| 2004/0094392 A1* | 5/2004 | Boudreau | B65G 15/62 |
| | | | 198/823 |
| 2010/0025199 A1* | 2/2010 | Ditaranto | B41M 5/267 |
| | | | 198/846 |
| 2014/0116850 A1* | 5/2014 | Musick | B65G 43/00 |
| | | | 198/617 |
| 2015/0353152 A1* | 12/2015 | Hakes | B62D 55/32 |
| | | | 305/15 |
| 2016/0076442 A1* | 3/2016 | Spohn | F02B 67/06 |
| | | | 701/29.4 |
| 2016/0200520 A1* | 7/2016 | Menke | B65G 17/08 |
| | | | 198/502.1 |

FOREIGN PATENT DOCUMENTS

| | | | |
|---|---|---|---|
| KR | 200168282 Y1 | 2/2000 | |
| KR | 100730079 B1 | 6/2007 | |
| KR | 20090072631 A | 7/2009 | |
| KR | 10-1671951 B1 | 11/2016 | |

* cited by examiner

CONVEYOR BELT FOR MARGINAL LIFE PREDICTION

BACKGROUND

1. Field

Embodiments of the present invention relate to a conveyor belt for marginal life prediction, and more particularly, to a conveyor belt for marginal life prediction for informing the replacement time of the conveyor belt in advance while allowing anybody to easily and visually know the abrasion extents of the conveyor belt without stopping of the conveyor belt on operation, and for predicting and managing the life time of the conveyor belt effectively.

2. Description of Related Art

Generally, a conveyor belt is a device operated by circulating a belt which is made of rubber, fabric, wire mesh, steel plate, and so on, and placing various articles on the conveyor belt and carrying them sequentially, and the side shape of the belt is formed as closed curve, and the belt is put on the pulley and is operated by rotating the pulley by electric motor.

Such a conveyor belt for carrying is worn out necessarily by the abrasion with carrying articles. Particularly, the conveyor belts in the ironworks factories, which are obliged for carrying transport objects such as iron stones, are placed under relatively further abrasion.

Generally, a normal conveyor belt is composed of an upper rubber on which transport articles are placed, and a lower rubber in which a reinforcing canvas is embedded, and the thickness between the upper surface of the conveyor belt on which transport articles contact and the reinforcing canvas determines the real usage thickness of the belt which can be substantially used.

The upper rubber of the conveyor belt which corresponds to the real usage thickness of the belt is worn out continuously by abrasion while transport articles such as irons are being carried thereon and the usage time of the belt is increased, and therefore, such an accident as belt cutting can be prevented only when sensing the time for replacing the belt in time being too late and only by changing such worn belts to a new one in advance.

Conventionally, there is little specific way of measuring the thickness of the remaining upper rubber only, and thus, the extent of abrasion was roughly estimated by measuring the entire thickness of the conveyor belt remained.

In order to measure even the thickness of the worn conveyor belt, it is necessary to stop the conveyor line on operation, and use a vernier caliper which is specifically manufactured, or use an ultrasonic equipment which is high expensive but incorrect in precision.

The conveyor line as above is very dangerous structurally for a worker to access or very difficult to measure the thickness of the belt according to the characteristics of the transported objects (kinds, size, amount).

Specifically, since it was difficult to visually see and check the abrasion extents of the conveyor belt by eyes, and impossible to find out the replacement time of the conveyor belt or the repair time thereof in time, there was a problem remained that the management of the conveyor belt equipment was not implemented properly.

As one of the related art of technology in order to solve the problem, it discloses Korean Registered Patent No. 1,671,951, entitled as "ABRASION INSPECTION TYPE CONVEYOR BELT AND MANUFACTURING METHOD THEREOF".

The related art of technology as above provides the effect of increasing the usage time of the conveyor belt by using the physical property of a worn-checked colored layer (colored doping layer) as specific value.

The conveyor belt of the related art of technology as above has a problem in that the colored layer for abrasion check is formed just as one single layer, and it just provides with the confirm of the conveyor belt being worn out, and thus, it is not efficient to prepare a new conveyor belt for replacement in advance in time, because it is difficult to check the abrasion extent properly by steps and predict the life time of the conveyor belt.

Further, since the colored layer for abrasion check is formed entirely on the conveyor belt in the longitudinal and widthwise directions, the formation of troughs is not properly made, and the angle of the trough is so small that there often occurs the problem that transported articles are easily released and fallen down out of the conveyor belt.

SUMMARY

Embodiments of the present invention provide a conveyor belt for marginal life prediction for checking the wear extents of the conveyor belt visually and easily, and predicting the life time of the conveyor belt well and conveniently, while not stopping the conveyor belt on operation and while contributing to further improve the function of the conveyor belt carrying articles.

In accordance with an aspect of the present invention, a plurality of abrasion check colored rubbers may be installed inside the conveyor belt in equal interval, and then, the abrasion check colored rubbers are exposed outwardly and seen visually by eyes, when the wear of an upper rubber of the conveyor belt is proceeded, so that the extent of the abrasion of the conveyor belt can be estimated and the exchange time of the conveyor belt can be well predicted.

Further, according to embodiments of the present invention, the abrasion check colored rubbers may be installed in multi-layers with the installation number reduced downwardly, so that the number of the exposed abrasion check colored rubbers is detected and the life time of the conveyor belt can be predicted step by step precisely.

Further, according to embodiments of the present invention, the abrasion check colored rubbers may be locally formed along the longitudinal direction of the conveyor belt or the widthwise direction thereof, thereby to greatly increase the functional performance of the troughs of the conveyor belt.

Therefore, according to embodiments of the present invention, since a plurality of abrasion check colored rubbers functioning as abrasion sensor are installed inside the conveyor belt, and anybody can see and know the outwardly-exposed colored rubbers by eyes when the abrasion is proceeded, the abrasion state and extents of the conveyor belt can be checked and its replacement time can be predicted. Further, without necessity of stopping the production lines of the conveyor belt on operation, since the acknowledgement of the abrasion state of the conveyor belt is possible, the production costs can be incredibly saved and the life time of the conveyor belt can be predicted easily and managed simply without other complex measurement devices.

Further, since the abrasion check colored rubbers of the present invention may be installed in multi-layers so that the number of the colored rubber being installed is reduced downwardly, the life time of the conveyor belt can be predicted step by step by seeing the number of the abrasion check colored rubbers exposed outwardly, and it is very convenient and efficient to prepare a new conveyor belt for replacement in time and the replacement time of the conveyor belt can be reduced radically and saved greatly.

Further, since the abrasion check colored rubbers of the present invention may be installed locally along the longitudinal direction or the widthwise direction, the troughs of the conveyor belt can be formed greatly and well and the entire function of the troughs can be radically improved because of big angle of the trough, thereby to provide the effect and the result of carrying articles more efficiently and well on the conveyor belt and preventing the occurrence of the articles deviated out of the conveyor belt in advance.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The foregoing and other features and advantages of the present inventions will be apparent from the more particular description of preferred embodiments of the present inventions, as illustrated in the accompanying drawings in which like reference characters refer to the same parts throughout the different views. The drawings are not necessarily to scale, emphasis instead being placed upon illustrating the principles of the present inventions. In the drawings.

DETAILED DESCRIPTION OF THE EMBODIMENTS

Figure 1:
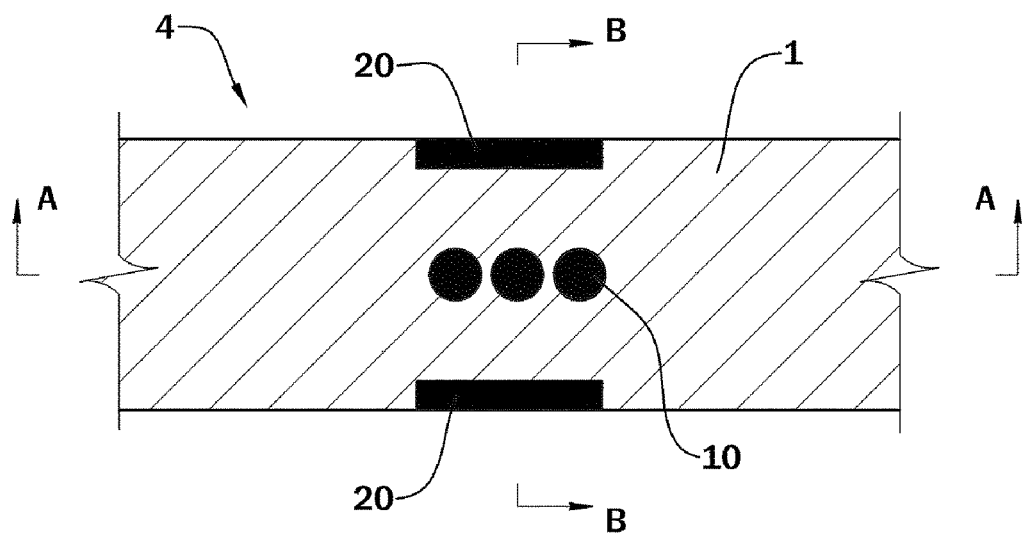
FIG. 1 is a plan sectional view of a conveyor belt according to one embodiment of the present invention.
Figure 2:
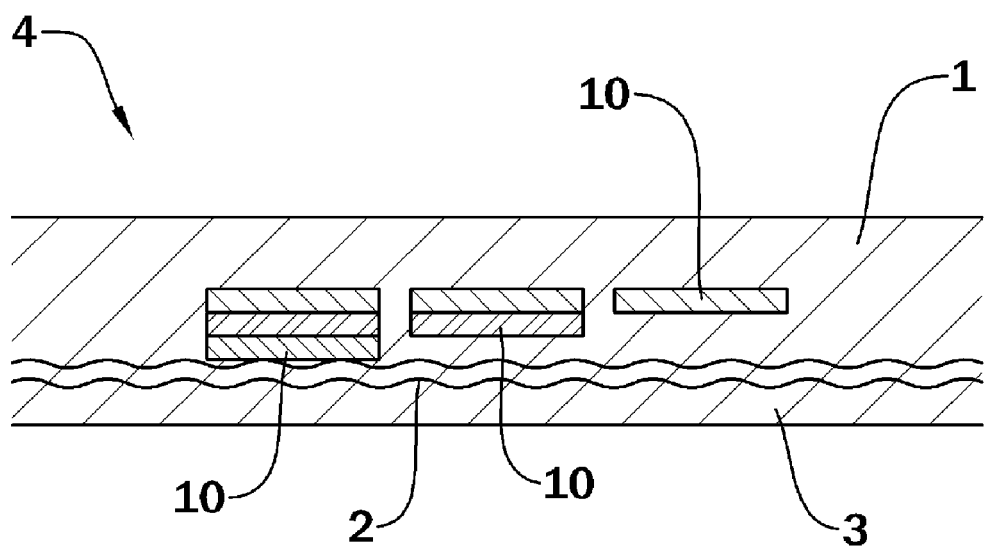
FIG. 2 is a sectional view taken along the line A-A of FIG. 1.

Since exemplary embodiments of the present invention are provided only for structural and functional descriptions of the present invention, the present invention should not be construed as limited to the embodiments set forth herein. Thus, it will be clearly understood by those skilled in the art that the exemplary embodiments of the present invention may be embodied in different forms and include equivalents that can realize the spirit of the present invention. It should be understood, however, that it is not intended to limit the present invention to the particular forms disclosed, but on the contrary, the present invention is to cover all modifications, equivalents, and alternatives falling within the spirit and scope of the present invention as defined by the appended claims.

The terminology used herein is for the purpose of describing particular embodiments only and is not intended to be limiting of the present invention. As used herein, the singular forms "a", "an" and "the" are intended to include the plural forms as well, unless the context clearly indicates otherwise. Terms indicating directions of apparatuses or elements (such as "front", "back", "up", "down", "top", "bottom", "left", "right", and "lateral") are used to simplify description of the invention and do not represent nor mean that the apparatuses or elements have specific directions.

The present invention will now be described more fully hereinafter with reference to the accompanying drawings, in which exemplary embodiments of the present invention are shown.

In schematic view of the entire structural configuration of the conveyor belt according to embodiments of the present invention with reference to attached drawings, there is provided a conveyor belt 4 which is shaped such that an upper rubber 1 and a lower rubber 3 are integrally formed, and the lower rubber 3 having a reinforcing canvas 2 inserted thereinto is located under the upper rubber 1 on which articles are placed, and a plurality of abrasion check colored rubbers 10 and 10a are embedded inside the upper rubber 1.

Hereinafter, the present invention schematically described as above will now be explained in more detail to be easily applied.

Figure 9:
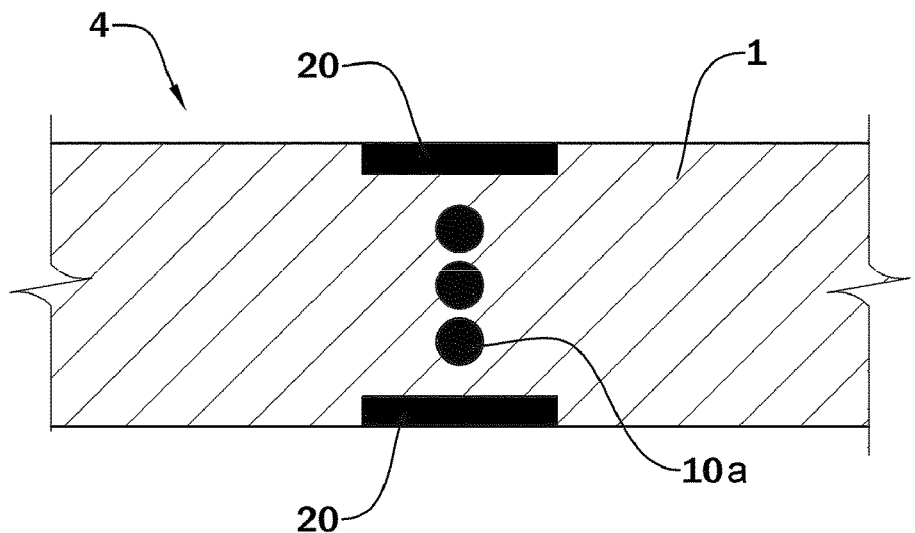
FIG. 9 is a plan sectional view of the conveyor belt according to another embodiment of the present invention.
Figure 10:
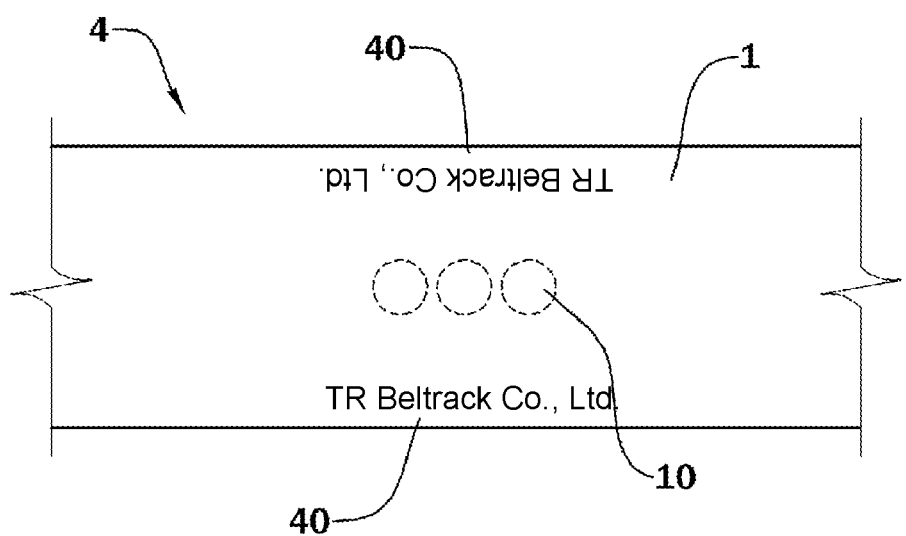
FIG. 10 is a plan view of the conveyor belt according to another embodiment of the present invention.

The abrasion check colored rubbers 10 and 10a are the core technology of the present invention for easily confirming the state of wear of the conveyor belt without stopping the running conveyor line. As shown in FIGS. 1 and 9, a plurality of abrasion check colored rubbers 10 and 10a are inserted and locally installed in equal interval inside the upper rubber 1 along the longitudinal direction or the widthwise direction of the conveyor belt 4.

While the conveyor belt 4 structured as above is carrying articles, the upper rubber 1 is further being worn out. When the abrasion check colored rubbers 10 and 10a are exposed outwardly, and they can be easily confirmed visually, thereby to inspect and manage the degree of the wear of the conveyor belt 4.

Here, the reason that the abrasion check colored rubbers 10 and 10a are not installed entirely on the conveyor belt 4 but installed locally thereon is that trough cannot be formed properly because of the excessive space occupied by the abrasion check colored rubbers 10 and 10a, and because of strong resistance occurred when trough is formed, and in order to prevent the angle of the trough being small.

Therefore, the present invention employs and combines together the technology that the abrasion check colored rubbers 10 and 10a are locally limitedly installed on the conveyor belt 4 along the longitudinal or widthwise direction of the conveyor belt 4 so that the function of the entire trough of the conveyor belt 4 can be greatly improved and the transportation of articles is efficiently made thereby to originally prevent the accidents of breakages of peripheral environmental objects or human injuries occurred when the carrying articles are leaked out of the conveyor belt 4 and fallen down in advance.

Further, the abrasion check colored rubbers 10 and 10a are installed in intervals so that the curved property of the conveyor belt 4 and the function of the troughs are further improved, and the abrasion check colored rubbers 10 and 10a are formed of various shapes such as circle or polygon.

Further, the abrasion check colored rubber 10 among the abrasion check colored rubbers 10 and 10a, which is installed on the portion of the conveyor belt 4 along the longitudinal direction thereof as shown in FIG. 1 is suitable to be used in such a conveyor belt 4 as in the longitudinal-direction central portion of the conveyor belt 4 according to the property of transported articles, which is much worn off or in a relatively narrow width portion thereof or where the angle of the trough is big.

The abrasion check colored rubber 10a installed in the widthwise direction as shown in FIG. 9 is very suitable in the conveyor belt 4 which is relatively wider in width or where has small-angled troughs, so as to provide a wide range of selection according to the property of transported articles and excellency in operation.

A new technology is applied in that the abrasion check colored rubbers 10 and 10a are installed in multi-layer up and down to be increased in number going downward.

That is, the abrasion check colored rubbers 10 and 10a are respectively installed in such a manner that one rubber can be installed as first layer on the upside of the lower rubber 3, two rubbers can be installed as second layer on the upside of the above first layer rubber, and three rubbers can be installed as third layer on the upside of the above second layer rubber.

Figure 3:
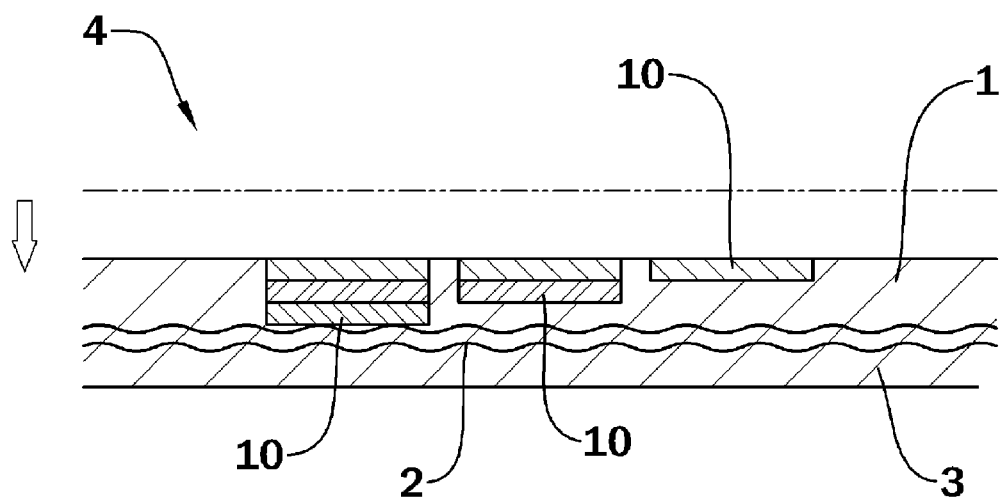
FIGS. 3 to 5 are front sectional views showing the states of checking the abrasion degree of the conveyor belt step by step by checking the number of exposed abrasion check colored rubbers of the present invention.
Figure 4:
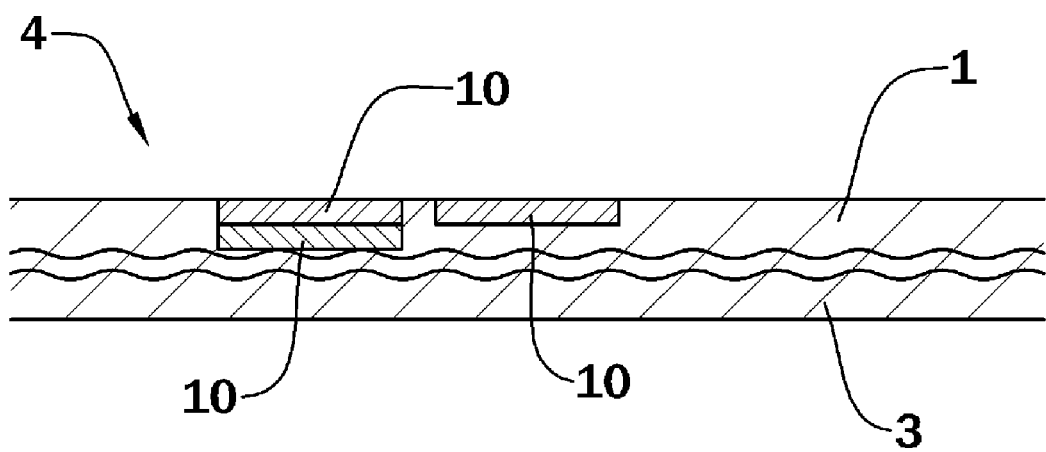
Figure 5:
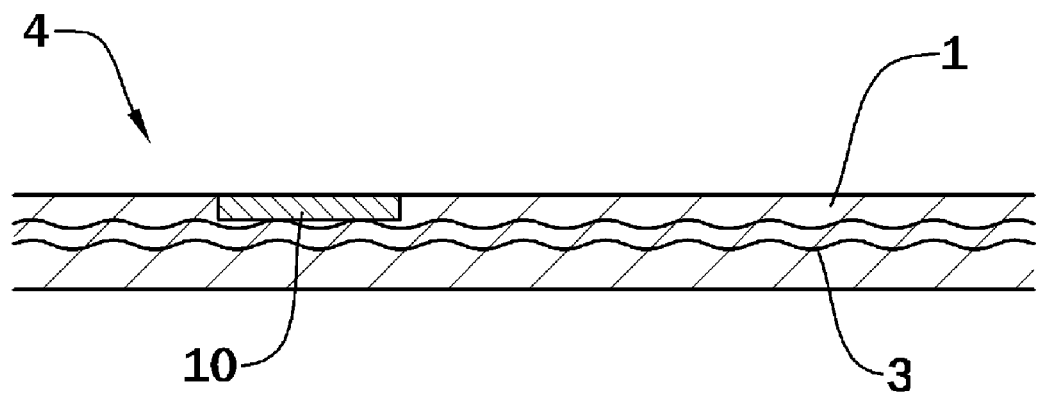
Figure 6:
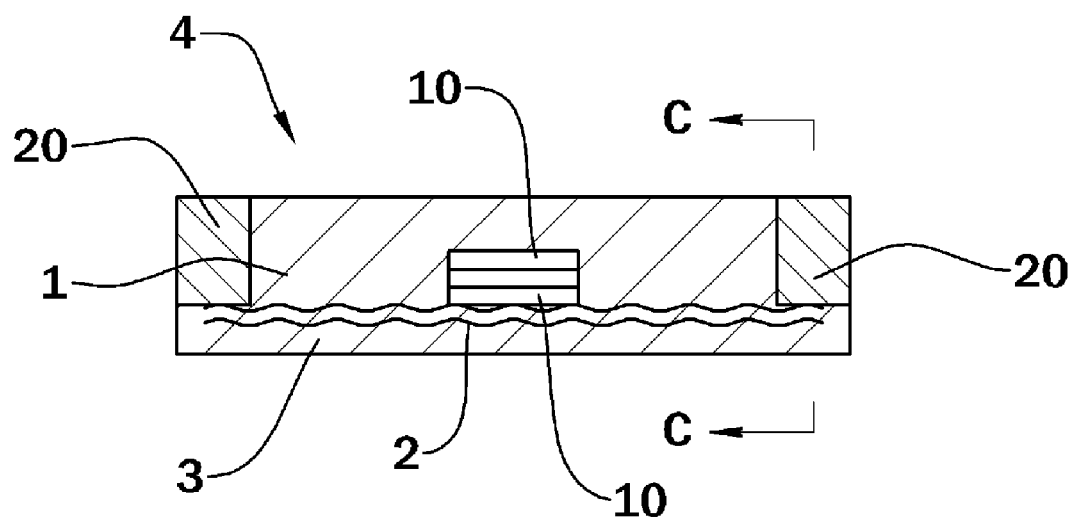
FIG. 6 is a sectional view taken along the line B-B of FIG. 1.
Figure 7:
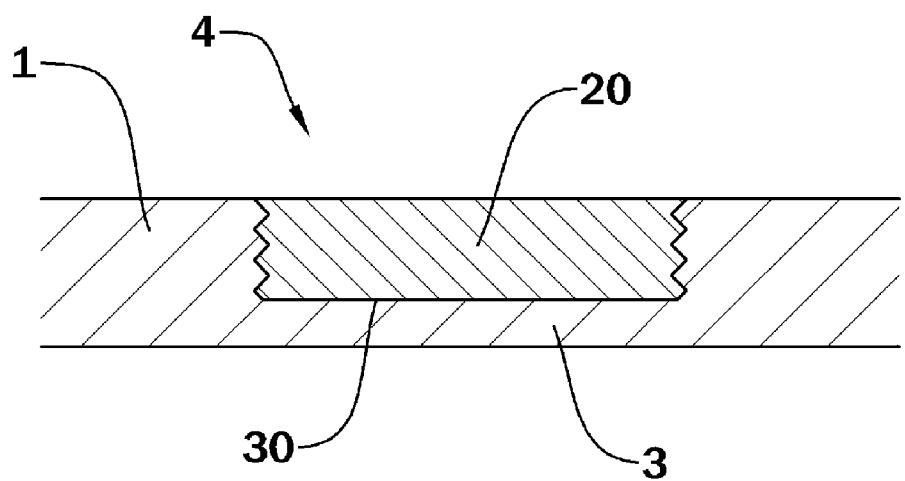
FIG. 7 is a sectional view taken along the line C-C of FIG. 6.
Figure 8:
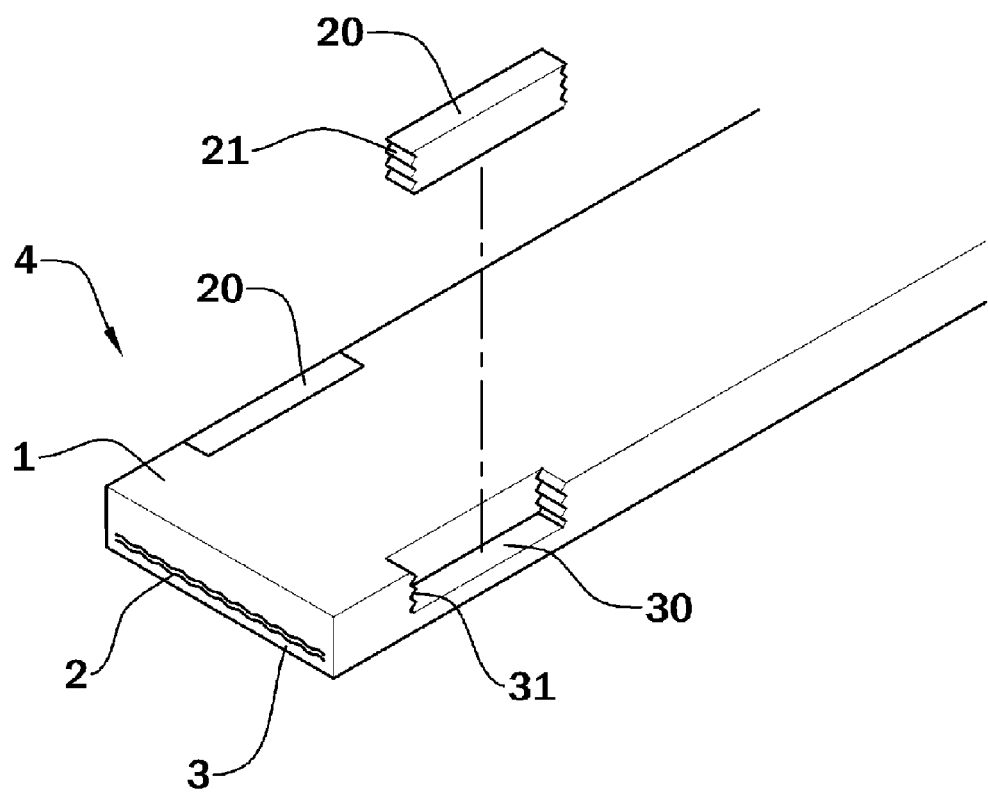
FIG. 8 is an exploded perspective view of the conveyor belt and location inspection markers of the present invention.

Therefore, while the wear of the conveyor belt 4 is progressed, the number of the exposed abrasion check colored rubbers 10 and 10a is checked, and specifically, when three abrasion check colored rubbers 10 and 10a are exposed while the wear of the upper rubber 1 is progressed as shown in FIGS. 3 to 5, it can be checked that 3 mm of the thickness of the conveyor belt being really usable is remained, and when two abrasion check colored rubbers 10 and 10a are exposed, it can be checked that 2 mm of the thickness of the conveyor belt being really usable is remained, and when one is exposed, it says that 1 mm of the thickness of the conveyor belt being really usable is remained. Thus, it provides the effect that the life time of the conveyor belt 4 can be estimated in steps by checking the number of the abrasion check colored rubbers 10 and 10a.

The abrasion check colored rubbers 10 and 10a structured and implemented as above are not limited to the exemplary embodiment of the present invention, but can be implemented in various ways, and installation number, location thereof, and so on can be employed in more wide selection and more various ways.

Meantime, the present invention also employs a technology of a location inspection marker 20 for the location where the abrasion check colored rubbers 10 and 10a are installed to be easily recognized so that working operators with weak eyesight or in ages and anybody can easily find out and recognize the location of the abrasion check colored rubbers 10 and 10a.

Marker insertion grooves 30 are respectively formed on the both ends of the upper rubber 1 near the abrasion check colored rubbers 10 and 10a along the longitudinal direction of the conveyor belt 4, and colored location inspection markers 20 are respectively inserted into the marker insertion grooves 30 and integrally formed therewith in order to further more easily identify the location of the abrasion check colored rubbers 10 and 10a.

Therefore, the location inspection marker 20 provides the effect that anybody enables to easily recognize and check the location of the abrasion check colored rubbers 10 and 10a once seeing the position of the location inspection markers 20 marked near the abrasion check colored rubbers 10 and 10a. While the upper rubber 1 is worn out, the location inspection markers 20 which are also worn out together with the upper rubber 1 are remained until one of the abrasion check colored rubbers 10 and 10a embedded at the lowest as the first layer is exposed, so that the location of the abrasion check colored rubbers 10 and 10a can be easily detected until the life time of the conveyor belt 4 is ended.

The location inspection markers 20 are manufactured separately, and they can be inserted into and integrally formed inside a metal mold during the vulcanized formation of the conveyor belt 4.

Further, a plurality of deviation prevention protrusions 21 and 31 are formed on the longitudinal both ends of the location inspection markers 20 and the marker insertion grooves 30 respectively, and the deviation prevention protrusions 21 and 31 are mutually engaged and coupled together, so as to prevent the location inspection marker 20 from being deviated out.

Further, since articles are hardly placed at both sides on the upside of the upper rubber 1, abrasion is rarely generated thereon, and the system can be structurally simplified without use of the location inspection marker 20.

For the structure as above, location indicators 40 can be respectively put at both sides on the upside of the upper rubber 1 near the abrasion check colored rubbers 10 and 10a, with the information such as product size or company mark, thereby to simplify the structure and allow the location of the abrasion check colored rubbers 10 and 10a to be easily recognized.

The foregoing is illustrative of embodiments and is not to be construed as limiting thereof. Although a few embodiments have been described, those skilled in the art will readily appreciate that many modifications are possible without materially departing from the novel teachings and advantages. Accordingly, all such modifications are intended to be included within the scope of this present invention as defined in the claims. In the claims, means-plus-function clauses are intended to cover the structures described herein as performing the recited function, and not only structural equivalents but also equivalent structures.

What is claimed is:

1. A conveyor belt for marginal life prediction comprising:
   a conveyor belt having an upper rubber and a lower rubber integrally formed, in which carrying articles are placed on the upper rubber and the lower rubber is placed under the upper rubber with a reinforcing canvas being inserted into the lower rubber; and
   a plurality of colored rubbers for abrasion check which are locally embedded inside the upper rubber in equal intervals along a longitudinal direction or a widthwise direction of the conveyor belt, in which the abrasion check colored rubbers are formed in multi-layer, and
   the abrasion check colored rubbers are formed such that one abrasion check colored rubber is placed on the lower rubber, two abrasion check colored rubbers are placed more apart from the lower rubber than said one abrasion check colored rubber, and three abrasion check colored rubbers are placed more apart from the lower rubber than said two abrasion check colored rubbers, and
   the life time of the conveyor belt is predicted by steps by inspecting the number of the abrasion check colored rubbers which are outwardly exposed while the abrasion of the upper rubber is proceeded.

2. The conveyor belt for marginal life prediction of claim 1, wherein marker insertion grooves are formed at both end sides of the upper rubber near the abrasion check colored rubbers, and location inspection markers for checking the location of the abrasion check colored rubbers are inserted into the marker insertion grooves respectively and integrally formed therein.

3. The conveyor belt for marginal life prediction of claim 2, wherein a plurality of deviation prevention protrusions are formed at both ends of the location inspection markers and the marker insertion grooves, respectively, and the deviation prevention protrusions are mutually engaged and coupled together.

4. The conveyor belt for marginal life prediction of claim 1, wherein location indicators are formed on both sides of an upper surface of the upper rubber, near the abrasion check colored rubbers.

\* \* \* \* \*